United States Patent
Chiussi et al.

[11] Patent Number: 6,021,116
[45] Date of Patent: Feb. 1, 2000

[54] METHOD AND APPARATUS FOR CONTROLLING DATA TRANSFER RATE USING VIRTUAL QUEUES IN ASYNCHRONOUS TRANSFER MODE NETWORKS

[75] Inventors: Fabio Massimo Chiussi, Tinton Falls; Vijay Pochampalli Kumar, Freehold, both of N.J.; Ye Xia, Richmond, Calif.

[73] Assignee: Lucent Technologies, Inc., Murray Hill, N.J.

[21] Appl. No.: 08/751,064

[22] Filed: Nov. 15, 1996

Related U.S. Application Data

[60] Provisional application No. 60/014,264, Mar. 28, 1996.

[51] Int. Cl.$^7$ .................................. H04J 1/16; H04J 3/14
[52] U.S. Cl. .......................................................... 370/236
[58] Field of Search .................................. 370/229, 230, 370/331, 232, 233, 234, 235, 236, 237, 252, 253, 259

[56] References Cited

U.S. PATENT DOCUMENTS

| | | | |
|---|---|---|---|
| 5,787,071 | 7/1998 | Basso et al. | 370/231 |
| 5,889,761 | 3/1999 | Yamato | 370/236 |

*Primary Examiner*—Ajit Patel

[57] ABSTRACT

A method and apparatus for computing a congestion indicator in a communications switch including monitoring at least one first congestion indicator in the communication switch, computing an arrival rate and a first and a second service rate, incrementing a second congestion indicator using the arrival rate, and decrementing the second congestion indicator using the first and second service rates. The method and apparatus are used for deciding to store the data and electronic code that arrives at a communications switch when the second congestion indicator is below a first threshold, and for deciding not to store the data and electronic code that arrives at a communications switch when the second congestion indicator equals or exceeds the first threshold. The method and apparatus are also used for controlling the data transfer rates of data sources in an ATM-based network when both available bit rate and other traffic is present in a communications switch. The method and the apparatus utilize intelligent marking to identify data sources with data transfer rates exceeding a marking threshold and direct those data sources to reduce their data transfer rates when the second congestion indicator exceeds a second threshold. When the second congestion indicator exceeds a third threshold or the first congestion indicator exceeds a fourth threshold, the method and apparatus direct all the data sources to reduce their data transfer rates. The marking threshold equals a function of the maximum data transfer rate multiplied by a function of the second congestion indicator.

44 Claims, 6 Drawing Sheets

METHOD AND APPARATUS FOR CONTROLLING DATA TRANSFER RATE USING VIRTUAL QUEUES IN ASYNCHRONOUS TRANSFER MODE NETWORKS

This nonprovisional application claims the benefit of the U.S. Provisional Application Ser. No. 60/014,264, filed Mar. 28, 1996.

BACKGROUND OF THE INVENTION

1. Field of the Invention

The present invention relates to a method and an apparatus for controlling data transfer rates of data sources by guaranteeing that a marking threshold is a good estimate of the fair share of the available bandwidth to which data transfer rates are supposed to converge, when available bit rate service and variable bit rate service are simultaneously provided in asynchronous transfer mode networks.

2. Description of Related Art

A service category, called available bit rate (ABR), has recently been introduced in asynchronous transfer mode (ATM) networks to support applications that cannot be addressed efficiently by existing constant bit rate (CBR), variable bit rate (VBR), and unspecified bit rate (UBR) services. The introduction of ABR services has been motivated by the need for supporting traffic generated by highly-bursty data applications, where data packets are segmented into ATM cells. Most of these applications cannot predict their own traffic parameters, but have well-defined cell loss requirements, in order to avoid throughput collapse due to packet retransmission. For these applications, a static allocation of resources at call setup time, as is used in CBR and VBR, would either be wasteful or inadequate. In ABR, only lower and upper bounds on the bandwidth of a connection are specified at call setup, and the ABR service guarantees a cell loss rate only to those connections whose source dynamically adapts its traffic in accordance with feedback received from the network. One issue with this service is to ensure fairness among the connections.

The definition of the congestion control scheme used to generate feedback information from the network to dynamically regulate the cell generation process of each virtual connection (VC) relies on the use of special control cells called resource management (RM) cells, which are used to convey control information to the end points. Each data source regularly sends forward RM cells every NRM data cells, where NRM is the number of data cells corresponding to the RM cell. When the destination receives forward RM cells, it returns the RM cell to the data source as a backward RM cell. The switches in the network can also directly generate backward RM cells to communicate congestion to the source. The RM cell contains data transfer information that instructs the source to either increase or decrease its rate. In particular, RM cells contain a bit called congestion indication (CI) bit, which is used to have a source increase or decrease its rate by some predefined amount, and a field, called the ER field, to carry a 16-bit floating-point number representing the explicit rate, which is an upper bound on the rate that a connection is allowed to transmit. The RM cells also contain a field, called the current cell rate (CCR) field, which is set by the source to its current allowed cell rate (ACR) when it generates a forward RM cell.

Each switch in the network which receives ATM traffic, controls congestion by implementing at least one of three methods: 1) EFCI marking, where the switch only marks a control bit in the data cells to indicate congestion, and relies on the destinations to convey information back to the sources by properly marking RM cells; 2) relative rate (RR) marking, where the switch uses RM cells to provide binary feedback on its state of congestion to each source; or 3) explicit rate (ER) marking, where the switch uses RM cells to explicitly provide the allowed rate to each source.

When ABR traffic interacts with VBR traffic, however, the VBR traffic, which is highly-bursty, may introduce considerable congestion in the network and thus degrade the performance of ABR traffic. The extent of the problem and the possible solutions depend on whether at the switches the two types of traffic are queued in a single queue or, as it is more common in current-generation switches, are assigned different delay priorities, which are handled by separate queues. In the case where the two types of traffic share the same queue, highly-bursty VBR traffic can at times dominate the common queue and prevent ABR traffic queued behind it from being served. As a result, the queue length is not a reliable indicator of congestion caused by ABR traffic, and the ABR schemes which use the queue length as a congestion indicator perform poorly, causing unfairness in a network topology with multiple switches (this is true also in the case where the queue length is made equal to the number of ABR cells only, rather than to the total number of cells in the queue).

In the case where the two types of traffic are handled by separate queues and a work-conserving scheduling algorithm is used to share the link capacity between the two queues, the performance of ABR traffic depends on the rate at which VBR traffic is served when both queues are backlogged (since the scheduling algorithm is work conserving, when only a single queue is active, it is always served at the full rate). If VBR traffic is only served at a rate equal to (or close to) the average rate of VBR traffic, and ABR traffic is given the remaining bandwidth, the two types of traffic are fully isolated, and the ABR schemes using the queue length as a congestion indicator show the same good performance as in the case without VBR traffic. However, with highly-bursty VBR traffic, the buffer size necessary to accommodate the VBR queue with such a scheduling policy becomes very large; other parameters for VBR traffic, such as delay, are also negatively affected. For this reason, in practice, VBR traffic is typically served at a rate higher than its average rate. A common choice is to use strict priority for VBR traffic, and serve ABR traffic only when there are no cells waiting in the VBR queue. In this case, the two types of traffic interact with each other, and the ABR performance degrades. The length of the ABR queue experiences very wide variations, since its service rate is modulated by the activity of the VBR queue, and the ABR queue length cannot serve any more as a reliable indicator of congestion caused by the activity of the ABR sources. As a result, under these conditions ABR schemes using the queue length as a congestion indicator introduce considerable unfairness.

Many methods that can be implemented at the switches to control the data rates of the connections have been devised. Such existing methods, however, either do not perform satisfactorily, or have high implementation complexity. Furthermore, such existing methods perform poorly when ABR traffic interacts with VBR traffic, as it is the case in ATM networks. Thus, a method and an apparatus for controlling switch behavior which is simple to implement, guarantees control on buffer size, and guarantees fairness is desired. It is also desired that such method and apparatus achieves such good performance when ABR and VBR traffic interact.

SUMMARY OF THE INVENTION

It is an object of the present invention to provide a method and an apparatus for controlling the data transfer rate of data sources in an ATM-based network when the ATM-network carries both available bit rate data sources and non-available bit rate data sources.

A communications switch that is part of the network receives electronic code and data from data sources and monitors at least one first congestion indicator, or queue length, and at least one second congestion indicator, or virtual queue length. When the at least one second congestion indicator equals or exceeds a first threshold, the communications switch transmits electronic code or a resource management (RM) cell, which includes data transfer rate information, to a first group of data sources, each data source in the first group of data sources having a data transfer rate greater than or equal to a communications switch marking threshold. The information included in the RM cell instructs each data source in the first group of data sources to reduce its data transfer rate. The communications switch transmits electronic code or a resource management (RM) cell, which includes data transfer rate information, to a second group of data sources, each data source in the second group of data sources having a data transfer rate smaller than the communications switch marking threshold. The information included in the RM cell instructs each data source in the second group of data sources to increase its data transfer rate. When the at least one second congestion indicator equals or exceeds the second threshold the communications switch transmits an RM cell to all data sources. The information included in the RM cell instructs the data sources to reduce the data transfer rates. When the at least one second congestion indicator is lower than the first threshold the communications switch transmits an RM cell to all data sources. The information included in the RM cell instructs the data sources to increase the data transfer rates. Finally, when the at least one first congestion indicator equals or exceeds a third threshold, the communications switch transmits an RM cell to all the data sources. The information included in the RM cell instructs the data sources to reduce the data transfer rates.

Other objects, advantages and salient features of the invention will become apparent from the detailed description taken in conjunction with the annexed drawings.

BRIEF DESCRIPTION OF THE DRAWINGS

The invention is described in relation to the accompanying drawings in which like reference numerals refer to like elements and wherein.

DETAILED DESCRIPTION OF PREFERRED EMBODIMENTS

Figure 1:
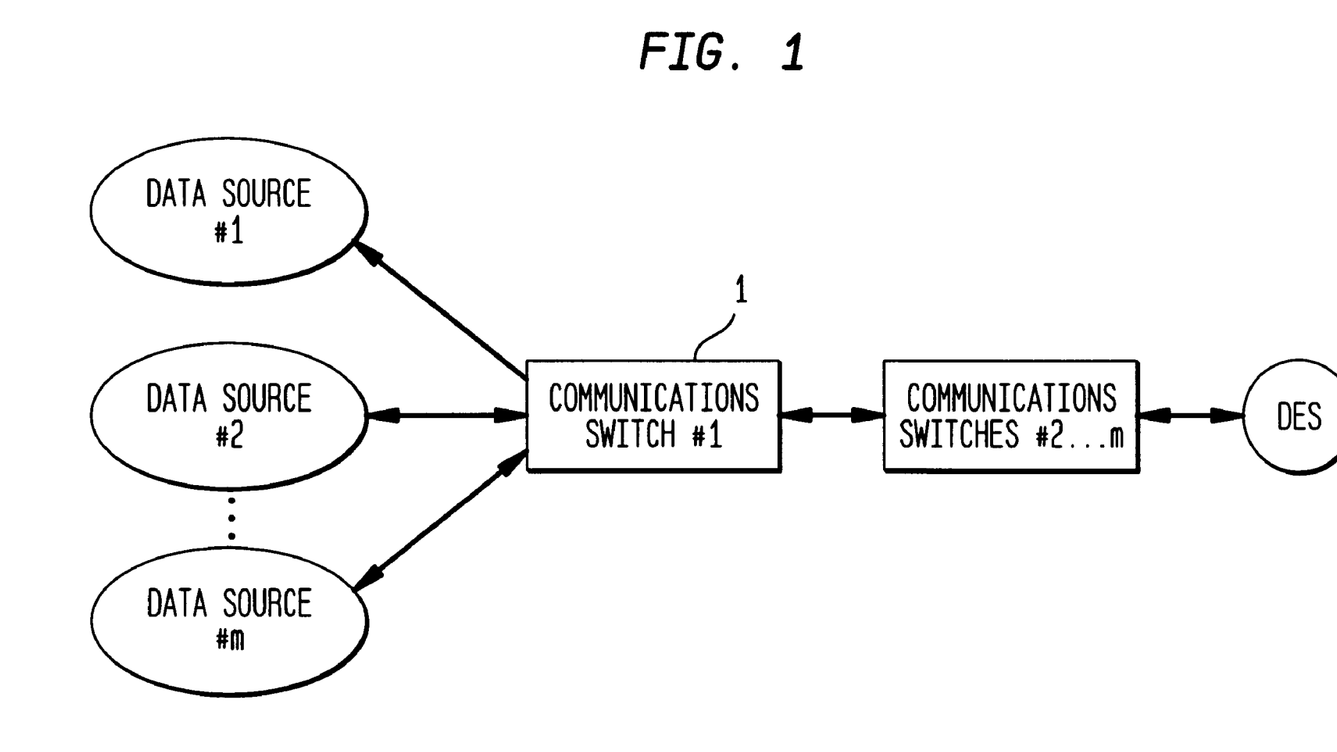
FIG. 1 depicts a number of data sources connected to a switch in an ATM-based network.

FIG. 1 shows a generalized ATM-based network. In the network a number of data sources 1, 2 . . . n are connected to a switch 1. The switch 1 may in turn be connected to switches 2 . . . m. Eventually data from data sources 1, 2 . . . n are transferred to a destination, DES. Any switch (from 1 to m) in the network may be used to control data transfer rates of the data sources, 1, 2 . . . n connected to switch 1 in order to prevent overload of the network.

To prevent overload, switch 1 adjusts the data transfer rates of the data sources, 1, 2 . . . n. To achieve even load conditions, each data source 1, 2 . . . n periodically sends an RM cell to the switch 1. The RM cell reaches its destination, which will return the RM cell to switch 1. Subsequently, the switch 1 will return the RM cell to each data source. The contents of the RM cell may be those specified by industry standards such as those promulgated by the ATM forum. When the RM cell is sent by the data source 1, 2 . . . n to the switch 1, the RM cell contains data transfer rate information regarding the data transfer or bit rate of the data source. When the RM cell is sent by the switch 1 to a data source 1, 2 . . . n, the RM cell contains data transfer rate information which instructs the data source to decrease its data transfer rate by a specific amount, or allows the data source to increase its data transfer rate by a predefined amount, or provides the source with an explicit rate, which is an upper bound of the data transfer rate, or Current Cell Rate (CCR), at which the data source is allowed to transmit.

Though the above description involves the use of only one switch (switch 1), it should be understood that any number of switches may be involved. For example, when multiple switches are involved, the RM cell sent by the data source may travel through each of the switches until it reaches the destination (or intermediate switch). The RM cell then returns to its originating data source. During the path from data source to destination and back to data source, any switch along its path may place data transfer rate information in the RM cell. This allows each switch in the network to control the data transfer rate of all data sources that transmit RM cells through such a switch, even if the data sources are physically connected to a different switch.

Hereafter, therefore, when reference is made to a single switch, such as switch 1, it should be understood that any switch in the network, not just the switch which is physically connected to the data sources, may control the data transfer rates of the data sources in the network.

Figure 2:
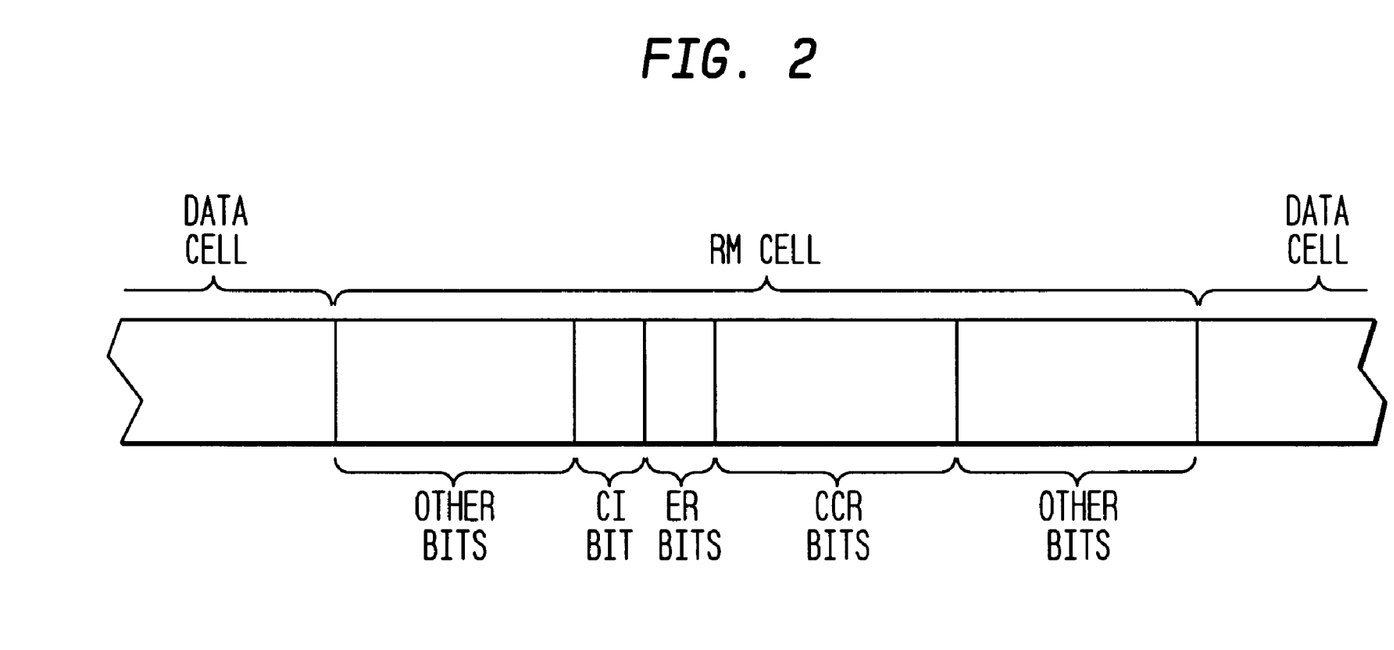
FIG. 2 depicts a generalized RM cell that is transmitted between data sources and switches of an ATM-based network according to one embodiment of the present invention.

FIG. 2 shows a generalized RM cell. When the switch 1 sends the RM cell to the data source 1, 2 . . . n, the RM cell may include a congestion indication (CI) bit, an explicit rate (ER) field or bits, and a current cell rate (CCR) field or bits.

In a preferred embodiment of the invention, the switch 1 uses a Dynamic Control Rate Algorithm with Virtual Queuing (DMRCA_VQ) to accommodate ABR traffic and other traffic such as VBR traffic. The discussion that follows describes only the effect of accommodating VBR traffic with ABR traffic, although it should be understood that other traffic, such as CBR traffic and UBR traffic, can be accommodated by this scheme.

In such preferred embodiment, the queue length cannot be used to accurately control congestion caused by ABR, since the queue length depends on the activity of both the ABR and the VBR traffic. Therefore, the switches 1, 2 . . . m also construct a virtual queue length. The virtual queue length is the number of ABR cells that would be waiting at the switch 1 if VBR traffic were not present, and an available bandwidth for ABR were made equal to an available bandwidth in a real scenario assuming VBR is allocated its average bandwidth.

When the switch 1 detects a congested state within the switch 1, the switch 1 will set the CI bit to a binary 1 or 0.

By setting the CI bit to 1 and then transmitting the RM cell to the data source 1, 2 . . . n, the switch 1 instructs the data source to decrease its data transfer rate. By setting the CI bit to 0 and then transmitting the RM cell to a data source 1, 2 . . . n, the switch 1 instructs the data source to increase its data transfer rate. The switch 1 may also use an explicit rate (ER) field to set data transfer rates of data sources 1, 2 . . . n.

Each data source 1, 2 . . . n of FIG. 1 also transmits an identifier or address to the switch 1 that identifies the data source from every other data source in the network.

Figure 3:
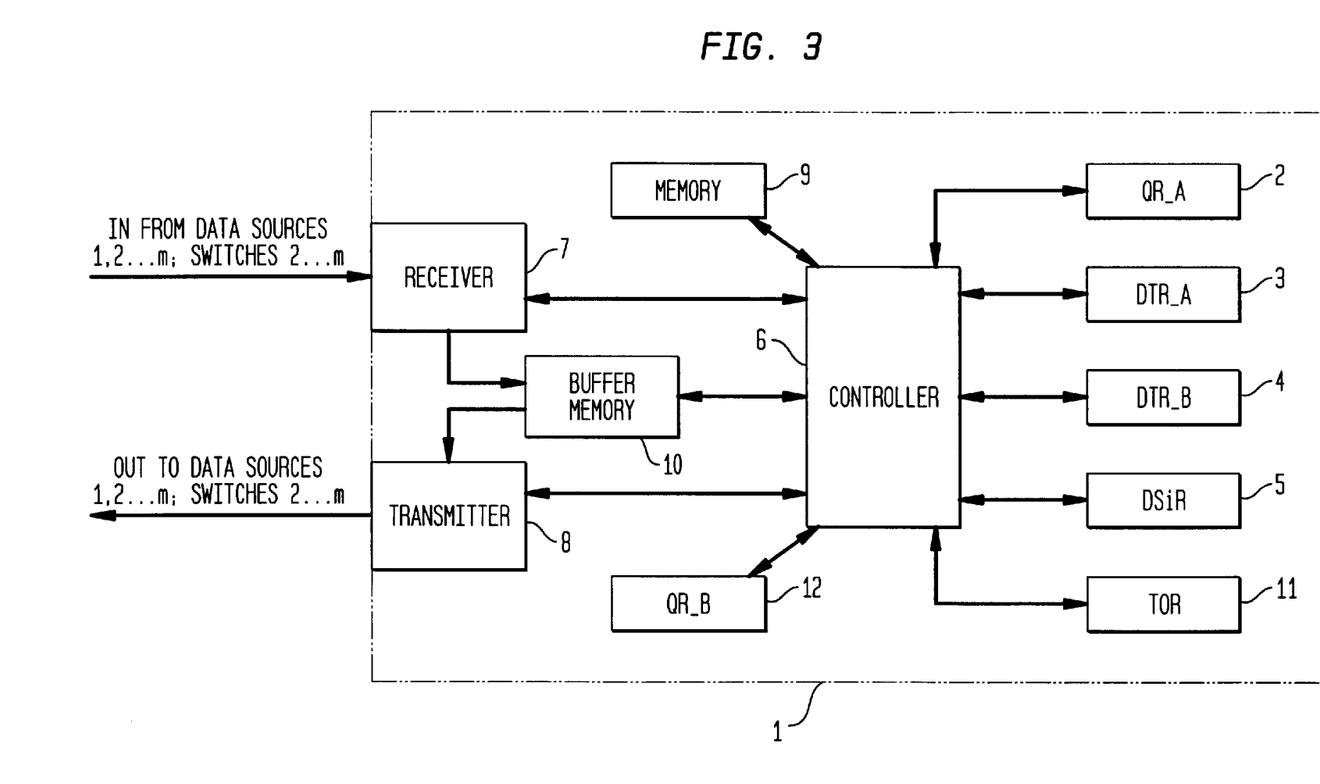
FIG. 3 is a block diagram of an apparatus according to one embodiment of the present invention for controlling the data transfer rates of data sources in an ATM-based network.

FIG. 3 shows a block diagram of an apparatus or switch 1 according to the present invention. As shown, the switch 1 includes at least one first queue length register (QR_A) 2 that generates at least one first congestion indicator or queue length, at least one second queue length register (QR_B) 12 that generates at least one second congestion indicator or virtual queue length, at least one first data transfer register (DTR_A) 3 that indicates switch maximum transfer rates, at least one time-out register (TOR) 11 that indicates a maximum period of time, MAX_TIMEOUT, within which the switch maximum data transfer rates must be updated, at least one second data transfer rate register (DTR_B) 4 that indicates current data transfer rate information and connection identifier of the data source that has sent the most recent RM cell that arrived at switch 1, and a data source identifying register (DSiR) 5 that indicates and identifies at least one data source that has a data transfer rate equal to the switch maximum data transfer rate.

Each of the registers may include a number of registers 1, 2 . . . k. The switch 1 also includes a transmitter 8 for transmitting RM cells and data cells to data sources or to other switches.

The switch 1 contains a memory 9 for storing reference information such as thresholds, variables or specific data transfer rates. Included in the switch 1 is a receiver 7 for receiving data including RM cells from all active connections for data sources 1, 2 . . . n as well as from other switches. The switch 1 also contains at least one buffer memory 10 for storing cells awaiting transmission to the next switch or communication link.

A controller 6 contains the algorithm for controlling the rate at which the data sources transmit data. The controller 6 is connected to receiver 7 and notes the values of current data transfer rate and virtual connection (VC) number of each data source 1, 2 . . . n. When data cells are received at the switch 1, the controller 6 directs the data cells to be stored in the buffer memory 10. The controller 6 then increments a value of the at least one first congestion indicator, or queue length, and stores the value in the QR_A 2. Subsequently, when the data cells are transferred from the switch 1, the controller 6 decrements the value of the at least one first congestion indicator.

The controller 6 updates a maximum rate (MAX) and a corresponding virtual connection number (MAX_VC) when the RM cell arrives from any data source 1, 2 . . . n with a current cell rate (CCR) greater than an existing value of the MAX stored in the DTR_A 3. The MAX is stored in the DTR_A 3 and the MAX_VC is stored in the DSiR 5. If more than one connection has a CCR equal to the new value of the MAX, the controller 6 records at least one of them in the corresponding MAX_VC in the DSiR 5. The value of the MAX is also updated every time an RM cell arrives from the data source corresponding to the connection currently identified by MAX_VC. One possible embodiment of an apparatus that updates the MAX is a controller that makes the value of the MAX equal to the content of the CCR field in the RM cell.

To smooth excess oscillations in the MAX, the controller 6 computes an adjusted maximum rate (A_MAX) using a running exponential weighted average with an averaging factor ALPHA, and stores the A_MAX in the memory 9. To make sure that information recorded in the MAX reflects the current status of each of the data sources 1, 2 . . . n, the controller 6 requires that the MAX be updated within a given time interval specified by the value stored in the TOR 11; otherwise the MAX is reset to 0.0. This is useful, for example, with bursty sources, to avoid that the MAX reflects the CCR of a data source that has become idle.

The controller 6 also stores a value of at least one second congestion indicator or virtual queue length in the second queue length register (QR_B) 12.

When VBR traffic is present, the controller 6 computes a total average bandwidth for the VBR traffic, which is simply a sum of an average bandwidth of each VBR data source, and stores the total average bandwidth for the VBR traffic in the memory 9. The controller 6 then subtracts the total average bandwidth for the VBR traffic from a total bandwidth available at the switch 1 to produce a Service Rate of ABR traffic. It should be understood that if other traffic, such as CBR traffic, is also present, the Service Rate of ABR traffic can still be computed and equal to the total bandwidth available at the switch 1 minus the total average bandwidth for the VBR traffic minus a total bandwidth of CBR traffic. The controller 6 also stores the Service Rate of ABR traffic in the memory 9. The controller 6 then uses the Service Rate of ABR traffic to decrement the virtual queue length. In other words, for each cell time (i.e., the time needed to transmit one cell), the controller 6 reduces the at least one second congestion indicator by the Service Rate of ABR traffic. Thus, if the Service Rate of ABR traffic were 50%, the controller 6 would reduce the virtual queue length by ½ for every cell time.

The controller 6 also increments the at least one second congestion indicator based on an arrival rate of cells at the switch 1. The controller 6 may increment the second congestion indicator every time electronic code or data cells arrive at the switch 1. However, to ensure the virtual queue length is independent of the VBR traffic, the arrival rate used for incrementing the at least one second congestion indicator should be equal to a rate of arrival in the case where the ABR traffic is fully isolated from the VBR traffic.

In the preferred embodiment, this is accomplished at the switch 1 by the ATM network modifying a priority of the ABR traffic's electronic code, or RM cells, so that the priority is higher than a priority of the VBR cells (although VBR traffic still maintains a higher priority than data in ABR traffic). Once the RM cells are given priority over VBR cells, they travel in the ATM-network unaffected by the VBR traffic, and can inform downstream switches 1, 2 . . . m of any ABR data traffic underway, but temporary blocked upstream because of the VBR traffic.

Then, when the RM cell arrives at the switch 1, the controller 6 posts NRM (where NRM is the number of data cells corresponding to the RM cell, e.g., 32) arrivals in the QR_B 12. By this manner, the at least one second congestion indicator is incremented and decremented. The controller 6 then uses the virtual queue length as an indication of congestion at the switch 1.

The controller 6 also computes a communications switch marking threshold (MT) that is used to perform intelligent marking of the data source 1, 2 . . . n. The communications switch marking threshold equals a first function of at least one communications switch maximum data transfer rate times a second function of the at least one second congestion indicator, where the first function of the at least one communications switch maximum data transfer rate may be the adjusted maximum rate A_MAX, and the second function of the at least one second congestion indicator may be a discreet, non-increasing function of the queue length, $0 \geq Fn^2 \geq 1$.

When the at least one second congestion indicator equals or exceeds a first threshold, QT, the controller 6 controls that the information contained in the RM cells that the transmitter 8 sends to those of the data sources 1, 2 . . . n whose data transfer rate is greater or equal than the marking threshold instructs those sources to reduce their data transfer rate, and that the information contained in the RM cells that the transmitter 8 sends to those of the data sources 1, 2 . . . n whose data transfer rate is lower than the marking threshold instructs those sources to increase their data transfer rate. The controller 6 may also control that the RM cells transmitted by transmitter 8 to the data sources 1, 2 . . . n have the explicit rate field set equal to the communications switch marking threshold.

If the at least one second congestion indicator equals or exceeds a second threshold, DQT, then the controller 6 controls that the RM cells that the transmitter 8 sends to each of the data sources 1, 2 . . . n in the network instructs all data sources to reduce their data transfer rates. The controller 6 may also control that the RM cells transmitted by transmitter 8 to the data sources 1, 2 . . . n have the explicit rate field set equal to the communications switch marking threshold times an at least one first variable MRF, where MRF is a major reduction factor; the at least one first variable MRF may have a value less than 1.

In the event the controller 6 determines the at least one second congestion indicator is less than the first threshold, the controller 6 controls that the RM cells that the transmitter 8 sends to each of the data sources 1, 2 . . . n in the network instructs those data sources that they are allowed to increase their data transfer rates.

Because the at least one second congestion indicator is used by the controller 6 in place of the first congestion indicator, or queue length, as a congestion indicator (i.e., whether the QT and DQT thresholds are exceeded is based on the length of the virtual queue rather than the length of the queue), buffer size requirements to accommodate an ABR queue and a VBR queue may become very large, or the ABR traffic may experience unwanted cell loss.

In one aspect of the preferred embodiment, the DMRCA_VQ uses both the at least one second congestion indicator and the at least one first congestion indicator as congestion indicators. In the first variation, called DMRCA_VQ with Hard Limitation on the Real Queue, the controller 6 computes a threshold, RDQT, on the at least one first congestion indicator, and stores the RDQT in the memory 9. If the queue length is below the threshold RDQT, the DMRCA_VQ is used, and congestion indication is based on the at least one second congestion indicator, with the thresholds QT and DQT. If the real queue length is above the threshold RDQT, DMRCA_VQ is disabled, and the controller 6 instructs all the data sources 1, 2 . . . n to decrease their data transfer rates regardless of the value of the at least one second congestion indicator.

Another variation of the preferred embodiment is called DMRCA_VQ with Soft Limitation on the Real Queue. In this aspect, rather than using the RDQT on the at least one first congestion indicator, the controller 6 uses a function of the at least one first congestion indicator to adjust the Service Rate of ABR traffic, which is the drain rate of the at least one second congestion indicator, or virtual queue length (i.e., the rate at which the second congestion indicator is decremented). Thus, the Service Rate of ABR traffic with a soft limitation (SRSL) equals the Service Rate of ABR traffic with no limitation (SRNL) (which is equal to the total bandwidth available at the switch 1 minus the total average bandwidth for the VBR traffic) times a correcting function Gn of the at least one first congestion indicator, or:

$$SR_{SoftLimitation} = SR_{NoLimitation} * Gn(\text{first congestion indicator})$$

where the correcting function Gn is a discreet, non-increasing function of the at least one first congestion indicator or queue length, $0 \geq Gn^2 \geq 1$. Thus, if the at least one first congestion indicator increases, the controller 6 reduces the drain rate of the at least one second congestion indicator. This reduction of the drain rate of the at least one second congestion indicator tends to increase the value of the at least one second congestion indicator, and in turn indicates increased congestion to the controller 6.

Figure 4A:
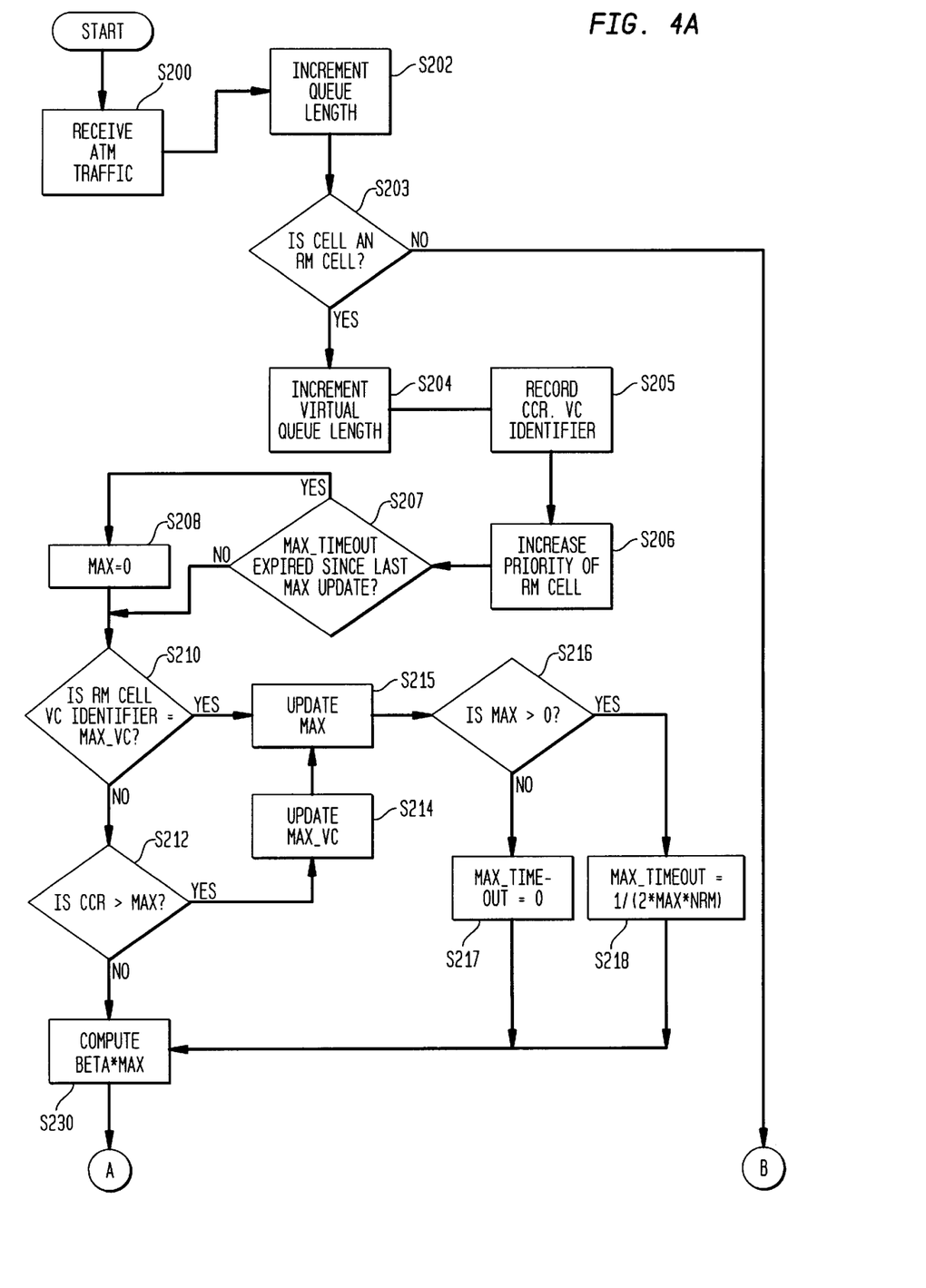
FIGS. 4A–4C are a flowchart of one method for controlling the data transfer rates of data sources in an ATM-based network in the presence of variable bit rate traffic.
Figure 4B:
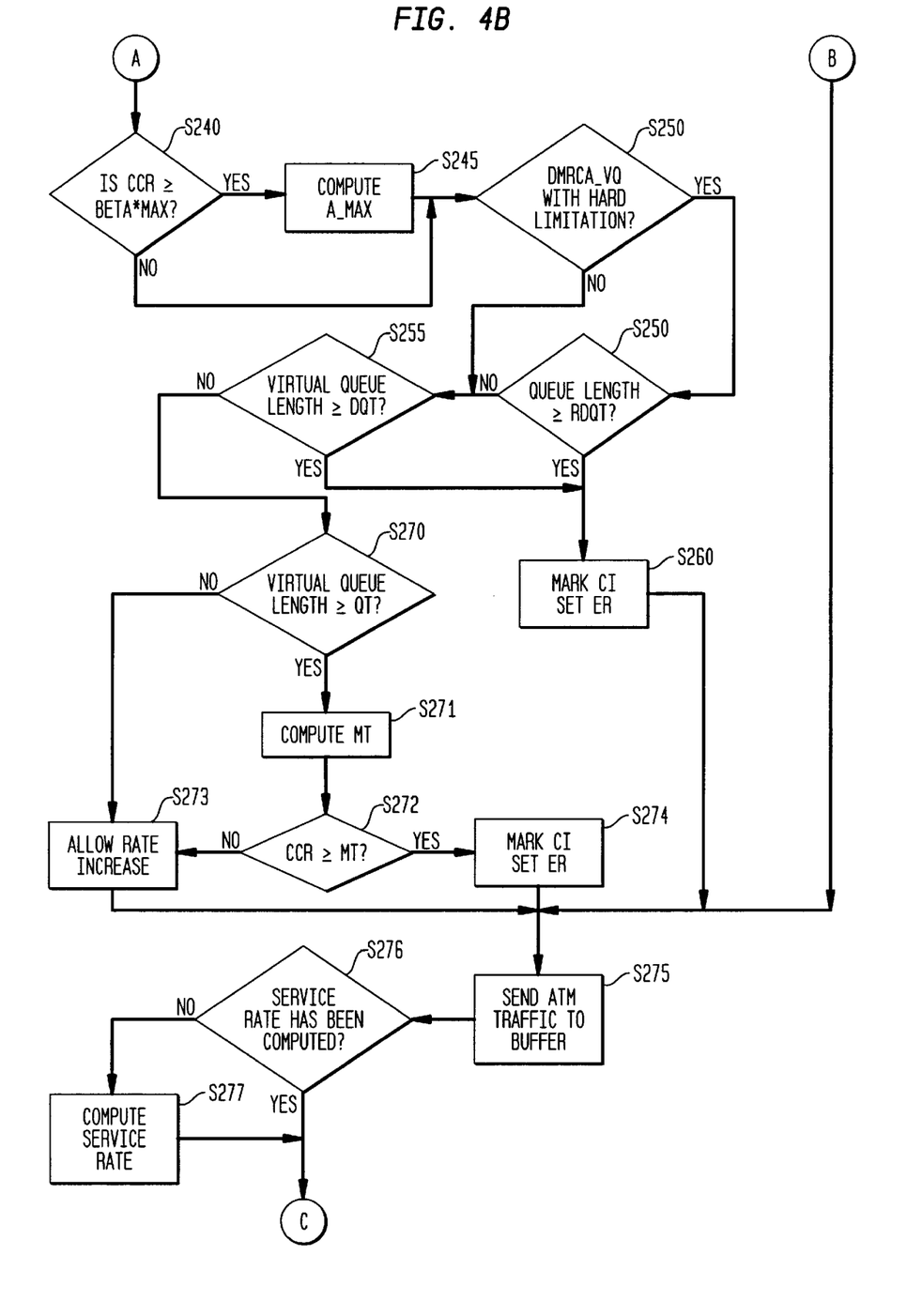
Figure 4C:
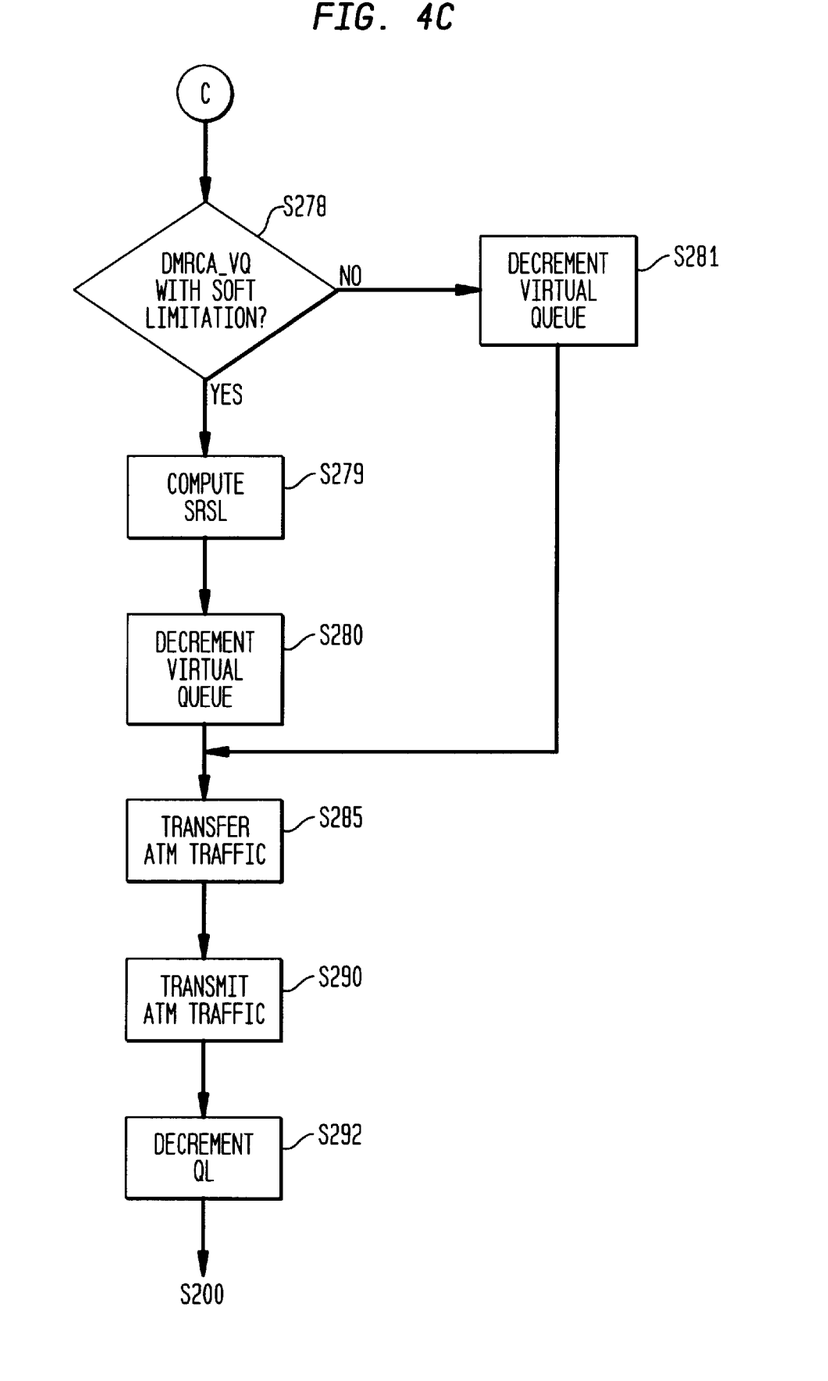

FIGS. 4A–4C are a flowchart showing the operation of a switch 1 employing the DMRCA_VQ algorithm.

Referring to FIGS. 4A–4C, in step S200, the switch 1 receives RM cells from data sources 1, 2 . . . n. The switch 1 then proceeds to step S202. In step S202, the controller 6 notes the arrival of the RM cells or data cells, increments the at least one first congestion indicator or queue length, QL, and stores the first congestion indicator or queue length in QR_A 2. The switch 1 then proceeds to step S203. In step S203, if the arriving cell is an RM cell, the switch 1 then proceeds to step S204. Otherwise, the switch 1 proceeds to step S275. In step S204, the controller 6 increments the at least one second congestion indicator or virtual queue length, VQL, by posting NRM arrivals for each RM cell received, and stores the new value for VQL in the QR_B 12. The switch 1 then proceeds to step S205. In step S205, the controller 6 notes the value of CCR and the data source (VC) identifier for the data source that has sent the RM cell and stores the CCR value and the corresponding data source (VC) identifier in the DTR_B 4. The switch 1 then proceeds to step S206.

In step S206, the controller 6 changes the priority of the RM cell, making it higher than the priority of VBR traffic. The switch 1 then proceeds to step S207.

In step S207, the controller 6 checks that the switch maximum data transfer rate has been updated within an interval specified by the MAX_TIMEOUT stored in the TOR 11. If the MAX has been updated within the interval specified by the MAX_TIMEOUT, the switch 1 proceeds to step S210. Otherwise, the switch 1 proceeds to step S208. In step S208, the controller 6 resets the value of the MAX stored in the DTR_A 3 to 0.

In step S210, the controller 6 compares the data source (VC) identifier of the RM cell stored in the DTR_B 4 with the data source identifying register DSiR 5 which identifies at least one data source MAX_VC that has data transfer rate equal to the switch maximum data transfer rate. If the VC identifier of the RM cell stored in the DTR_B 4 is equal to MAX_VC, the switch 1 proceeds to step S215. Otherwise, the switch 1 proceeds to step S212. In step S212, the controller 6 compares the CCR of the RM cell stored in the DTR_B 4 to the current value of the MAX maintained in the DTR_A 3. If the CCR in the DTR_B 4 is greater than the MAX, the switch 1 proceeds to step S214. Otherwise, the switch 1 proceeds to step S230.

In step S214, the controller 6 updates the value of the MAX_VC making it equal to the data source identifier of the data source that sent the RM cell, and stores the value of the MAX_VC in the DSiR 5. The switch 1 then proceeds to step S215.

In step S215, the controller 6 updates the value of the MAX making it equal to the CCR of the RM cell stored in the DTR_B 4 and stores the value of the MAX in the DTR_A 3. The switch 1 then proceeds to step S216. In step S216, if the value of the MAX is greater than 0, the switch 1 proceeds to step S218. Otherwise the switch 1 proceeds to step S217. In step S217, the value of the MAX_TIMEOUT stored in the TOR 11 is updated by making it equal to 0. The switch 1 then proceeds to step S230. In step S218, the value of the MAX_TIMEOUT stored in the TOR 11 is updated by making it equal to 1 divided by 2 times MAX times the value of NRM corresponding to the data source identified by MAX_VC. The switch 1 then proceeds to step S230.

In step S230, the controller 6 computes BETA*MAX, where BETA is a second variable of value lower or equal than 1, and greater than 0, and stores the value in the memory 9. The switch 1 then proceeds to step S140.

In step S240, the controller 6 compares the CCR of the RM cell stored in the DTR_B 4 to BETA*MAX. If the CCR is greater or equal than BETA*MAX, the switch 1 proceeds to step S245. Otherwise, the switch 1 proceeds to step S250.

In step S245, the controller 6 computes the adjusted maximum rate, A_MAX, using an exponential running average with averaging factor ALPHA, where ALPHA is a third variable of value lower than or equal to 1. The controller 6 then stores the value of the A_MAX in memory 9. The switch 1 then proceeds to step S250.

In step S250, the controller 6 checks if the DMRCA_VQ with Hard Limitation on the Real Queue will be used. If the DMRCA_VQ with Hard Limitation on the Real Queue will be used, the switch 1 proceeds to step S251, otherwise the switch 1 proceeds to step S255.

In step S251, the controller 6 monitors the at least one first congestion indicator or queue length stored in the first queue length register (QR_A) 2. If in step S251 the at least one first congestion indicator equals or exceeds the third threshold, RDQT, the switch 1 proceeds to step S260. Otherwise, the switch 1 proceeds to step S255.

In step S255, the controller 6 monitors the at least one second congestion indicator or virtual queue length stored in the second queue length register (QR_B) 12.

If in step 255 the at least one second congestion indicator equals or exceeds the second threshold, DQT, the switch 1 proceeds to step S260. Otherwise, the switch 1 proceeds to step S270.

In step S260, with the at least one second congestion indicator in the QR_B 12 equaling or exceeding the second threshold, DQT, the controller 6 marks the congestion indicator (CI) bit in the RM cell making it equal to 1, and sets the ER field in the RM cell making it equal to A_MAX times MRF, where MRF is the major reduction factor. Once the RM cell is transmitted and reaches its corresponding data source, the RM cell instructs such data source to reduce its data transfer rate to a value lower or equal than A_MAX times MRF. The switch 1 then proceeds to step S275.

In step S270, the controller 6 compares the at least one second congestion indicator or virtual queue length to the first threshold value QT. If the at least one second congestion indicator is greater or equal than QT, the switch 1 proceeds to step S271. Otherwise the switch 1 proceeds to step S273.

In step S271, the switch 1 computes the communications switch marking threshold making it equal to A_MAX times a function of the at least one second congestion indicator or virtual queue length and stores the communications switch marking threshold in the memory 9. The switch 1 then proceed to step S272.

In step S272, the switch 1 compares the CCR of the RM cell stored in the DTR_B 4 to the marking threshold MT stored in the memory 9. In step S272, if the CCR of the RM cell is greater than or equal to the communications switch marking threshold, the switch 1 proceeds to step S274. Otherwise, the switch 1 proceeds to step S273.

In step S273, the switch 1 allows the data transfer rate of the data source that sent the RM cell to increase. This is accomplished by making the CI bit in the RM cell equal to 0. When the RM cell is transmitted to the data source, the RM cell instructs such data source to increase its data transfer rate.

In step S274, with the at least one second congestion indicator greater than the first threshold, QT, the controller 6 marks the CI bit in the RM cell, making it equal to 1. The controller 6 may also set the ER field in the RM cell equal to A_MAX. Once the RM cell is transmitted to the data source and reaches such data source, the RM cell instructs such data source to reduce its data transfer rate. The switch 1 then proceeds to step S275.

In step S275, the controller 6 sends the ATM traffic (RM cells, ABR data cells, or VBR traffic) to the buffer memory 10. The controller 6 stores the ABR data cells in an ABR queue, the VBR traffic in a VBR queue, and the electronic code or RM cell in a queue that has higher priority than the VBR queue. The switch 1 then proceeds to step S276.

In step S276, the controller 6 checks if the Service Rate of ABR traffic has been computed and stored in the memory 9. If in step S276, the controller 6 determines that the Service Rate of ABR traffic has not been computed, the switch 1 proceeds to step S277. Otherwise the switch 1 proceeds to step S278. In step S277, the controller 6 computes the total average bandwidth for the VBR traffic and the Service Rate of ABR traffic, and stores these values in the memory 9. The switch 1 then proceeds to step S278.

In step S278, the controller 6 determines if the DMRCA_VQ with Soft Limitation on the Real Queue will be used. If in steps S278 the controller determines that DMRCA VQ with Soft Limitation on the Real Queue will be used, the switch 1 proceeds to step S279. Otherwise, the switch 1 proceeds to step S281.

In step S279, the controller 6 computes the SRSL and stores the value of the SRSL in the memory 9. The switch 1 then proceeds to step S280. In step S280, the controller 6 decrements the at least one second congestion indicator or virtual queue length by the value of SRSL, and stores the updated value of the at least one second congestion indicator in the QR_B 12. The switch 1 then proceeds to step S285.

In step S281, the controller 6 decrements the at least one second congestion indicator or virtual queue length by the value of the Service Rate of ABR traffic stored in the memory 9, and stores the updated value of the at least one second congestion indicator in the QR_B 12. The switch 1 then proceeds to step S285.

In step S285, the controller 6 transfers an amount of the ATM traffic (RM cells or data cells) from the buffer memory 10 to the transmitter 8 and the switch 1 then proceeds to step S290. In step S290, the transmitter 8 transmits the ATM traffic. Data cells are transmitted to the destinations or to other switches, and RM cells are transmitted to their source, or to the destinations, or to other switches. The switch 1 then proceeds to step S292.

In step S292, the controller 6 decrements the at least one first congestion indicator or queue length based on the amount of the ATM traffic transmitted in step S290 and stores the updated value of the at least one first congestion indicator in the QR_A 2. The switch 1 then returns to step S200.

The above described embodiment is but one example of the method and apparatus that may be used to control congestion in an ATM-based network. Modifications to the above-described embodiment may occur to those skilled in the art without departing from the spirit and scope of the present invention as defined in the appended claims.

What is claimed is:

1. A method for determining a congestion indicator in a communications switch, the communications switch receiving data and electronic code from at least one other communication switch and a data source and a transmitting data and electronic code to at least one other communications switch containing at least one buffer memory for storing data and electronic code awaiting transmission to at least one other communications switch and a destination, the method comprising:

monitoring at least one first congestion indicator in the communications switch;

updating the at least one first congestion indicator as the communications switch receives data and electronic code from the at least one other communications switch and the data source and transmits data and electronic code to the at least one other communications switch, the data source, and the destination; and updating at least one second congestion indicator, wherein the at least one second congestion indicator is incremented by an arrival rate and is decremented by one of a first service rate and a second service rate.

2. The method of claim 1, wherein the arrival rate of the at least one second congestion indicator is equal to 1 when the communications switch receives a specified amount of data from at least one data source, the arrival rate of the at least one second congestion indicator is equal to 0 when the communications switch does not receive a specified amount of data from at least one data source, the first service rate of the at least one second congestion indicator is equal to 1 when the communications switch transmits a specified amount of data to the at least one other communications switch and the destination, and the first service rate of the at least one second congestion indicator is equal to 0 when the communications switch does not transmit a specified amount of data to the at least one other communications switch and the destination.

3. The method of claim 1, wherein the arrival rate of the at least one second congestion indicator is a first function of at least one of data and electronic code received by the communications switch and the first service rate of the at least one second congestion indicator is a function of the at least one of data and electronic code received by the communications switch.

4. The method of claim 1, wherein the first service rate of the at least one second-congestion indicator is a function of at least the data rate of at least one of the data sources.

5. The method of claim 1, wherein the switch receives electronic code from the data sources, the electronic code comprising data transfer rate information, and the arrival rate of the at least one second congestion indicator is a function of the data transfer rate information in the electronic code.

6. The method of claim 1, wherein the first service rate and the second service rate of the at least one second congestion indicator are equal.

7. The method of claim 1, wherein the second service rate of the at least one second congestion indicator is a function of the at least one first congestion indicator.

8. The method of claim 7, wherein the function of the at least one first congestion indicator is a linear function.

9. The method of claim 7, wherein the function of the first congestion indicator is a non-linear function.

10. The method of claim 1, wherein the second service rate of the at least one second congestion indicator is a function of a total buffer memory available in the communications switch.

11. The method of claim 10, wherein the function of the total buffer memory available in the communications switch is a linear function.

12. The method of claim 10, wherein the function of the total buffer memory available in the communications switch is a non-linear function.

13. The method of claim 1, wherein a plurality of first congestion indicators are monitored and updated and at least one second congestion indicator is updated every time at least one first congestion indicator in the plurality of the first congestion indicators is updated.

14. The method of claim 13, wherein the arrival rate of the at least one second congestion indicator is a function of a plurality of first congestion indicators and of the data transfer rate of at least one data source, and the first service rate of the at least one second congestion indicator is an function of the plurality of first congestion indicators and of the data transfer rate of at least one data source.

15. The method of claim 1, wherein the communications switch receives the data and electronic code and stores the data and electronic code in the buffer memory when the at least one second congestion indicator is below at least one first threshold, and the communications switch receives the data and electronic code and does not store the data and electronic code in the buffer memory when the at least one second congestion indicator is greater than or equal to the at least one first threshold.

16. The method of claim 1, wherein the method is used in an asynchronous transfer mode-based network for controlling data transfer rates of data sources, the method further comprising:

transmitting electronic code comprising data transfer rate information from at least the communications switch to a first group of data sources, each one of the data sources in the first group of data sources having a data transfer rate greater than or equal to a communications switch marking threshold, the communications switch marking threshold being equal to a first function of at least one communications switch maximum data transfer rate multiplied by a second function of at least the second congestion indicator, when the at least one second congestion indicator equals or exceeds a first threshold;

transmitting electronic code comprising data transfer rate information from at least the communications switch to a second group of data sources, each one of the data sources in the second group of data sources having a data transfer rate lower than the communications switch marking threshold when the at least one second congestion indicator equals or exceeds a first threshold, wherein the data transfer rate information transmitted to the first group of data sources is used by each one of the data sources in the first group of data sources to reduce its data transfer rate, the data transfer rate information transmitted to the second group of data sources is used by each one of the data sources in the second group of data sources to increase its data transfer rate;

transmitting electronic code from the communications switch to all the data sources when the at least one second congestion indicator equals or exceeds a second threshold, wherein the data transfer rate information transmitted to all of the data sources when the at least one second congestion indicator equals or exceeds a second threshold is used by each data source to reduce its data transfer rate; and transmitting electronic code from the communications switch to all the data sources when the at least one second congestion indicator is lower than the first threshold, wherein the data transfer rate information transmitted to all of the data sources when the at least one second congestion indicator is lower than the first threshold is used by each data source to increase its data transfer rate.

17. The method of claim 16, further comprising transmitting electronic code from the communications switch to all the data sources when the at least one first congestion indicator is greater than or equal to a third threshold, wherein the data transfer rate information transmitted to all of the data sources when the at least one second congestion indicator is greater or equal than the third threshold is used by each data source to decrease its data transfer rate.

18. The method of claim 17, wherein the at least one communications switch maximum data transfer rate and at least one data source identifier are updated after the communications switch receives electronic code comprising data transfer rate information from at least one data source, the at least one data source identifier identifying at least one data source having a data transfer rate equal to the at least one communications switch maximum data transfer rate.

19. The method of claim 17, wherein the at least one communications switch maximum data transfer rate and at least one data source identifier are updated after the communications switch fails to receive the electronic code from at least one data source, the at least one data source identifier identifying at least one data source having a data transfer rate equal to the communications switch maximum data transfer rate.

20. The method of claim 17, wherein updating the at least one communications switch maximum data transfer rate and the at least one data source identifier is not dependent upon the electronic code received from the at least one data source.

21. The method of claim 17, wherein the first function used to determine the communications switch marking threshold is a linear function of the at least one communications switch maximum data transfer rate.

22. The method of claim 17, where the first function used to determine the communications switch marking threshold is a running exponential weighted average of the at least one communications switch maximum data transfer rate and the data transfer rate information received in the electronic code.

23. The method of claim 17, wherein the first function used to determine the communications switch marking threshold is determined when the data transfer rate in the electronic code of at least one of the data sources equals the communications switch maximum transfer rate multiplied by a first variable.

24. The method of claim 23, wherein the first variable is a fraction of the number one.

25. The method of claim 23, wherein the first variable equals one.

26. The method of claim 17, wherein the second function used to determine the communications switch marking threshold is a linear function of at least the second congestion indicator.

27. The method of claim 17, wherein the second function used to determine the communications switch marking threshold is a non-linear function of at least the second congestion indicator.

28. The method of claim 17, wherein the second function used to determine the communications switch marking threshold is a function of the total buffer memory available in the communications switch.

29. The method of claim 17, wherein the second function used to determine the communications switch marking threshold is a function of at least one third congestion indicator.

30. The method of claim 29 wherein the third congestion indicator is a function of an amount of data traffic and an amount of electronic code received in a specified interval.

31. The method of claim 30, wherein the specified interval is continuously updated.

32. The method of claim 17, wherein the at least one first congestion indicator is a function of at least one queue length in the communications switch.

33. The method of claim 17, wherein the at least one first congestion indicator is a function of the total available buffer memory in the communications switch.

34. The method of claim 17, wherein the data sources include one of available bit rate data sources and non-available bit rate data sources.

35. The method of claim 34, further comprising assigning a first priority to the electronic code received at the communications switch from the available bit rate data sources, the first priority greater than a second priority of the non-available bit rate data sources.

36. An apparatus for determining a congestion indicator in a communications switch, the communications switch receiving data and electronic code from at least one other communications switch and a data source and transmitting data and electronic code to at least one of the other communications switch and a destination, the communications switch containing at least one buffer memory for storing data and electronic code awaiting transmission to the at least one other communications switch and the destination, the apparatus comprising:

a first congestion indicator register that stores at least one first congestion indicator;

a second congestion indicator register that stores a second congestion indicator;

a first controller for monitoring and for updating the at least one first congestion indicator, for determining an arrival rate, for determining a first service rate, for determining a second service rate, for incrementing the at least one second congestion indicator using the arrival rate, for decrementing the at least one second congestion indicator using the first ad the second service rate, and for monitoring the at least one second service rate, and for monitoring the at least one second congestion indicator as the communications switch receives data and electronic code from the at least one other communications switch and the data source and transmits data and electronic code to the at least one other communications switch, the data source, and the destination.

37. The apparatus of claim 36, further comprising means for monitoring a total buffer memory available in the communications switch.

38. The apparatus of claim 36, further comprising means for monitoring an amount of data and an amount of electronic code received in a specified interval.

39. The apparatus of claim 36, further comprising a second controller, the second controller storing the data and electronic code in the buffer memory when the at least one second congestion indicator is below at least one first threshold, and the second controller not storing the data traffic and electronic code in the buffer when the at least one second congestion indicator is greater than or equal to the at least one first threshold.

40. The apparatus of claim 36, wherein the apparatus further comprises:

a first data transfer rate register that indicates at least one communications switch maximum data transfer rate;

a second data transfer rate register that indicates data transfer rate information from at least one data source;

a data source identifying register that provides a data source identifier that indicates at least one data source having a data transfer rate equal to the switch maximum data transfer rate;

a time-out register that indicates a time-out, the time-out being a maximum period of time within which the communications switch maximum data transfer rate must be updated;

a transmitter for transmitting electronic code comprising data transfer rate information to the data sources; and a second controller for monitoring the at least one second congestion indicator, the at least one communications switch maximum data transfer rate, the time-out, and the data source identifier, the second controller updating the at least one communications switch maximum data transfer rate, the time-out and the data source identifier, and controlling the transmitter to transmit the electronic code to a first group of data sources, each of the data sources in the first group of data sources having a data transfer rate at least equal to a communications switch marking threshold, the communications switch marking threshold being equal to a first function of the at least one communications switch maximum data transfer rate multiplied by a second function of the at least one second congestion indicator when the at least one second congestion indicator equals or exceeds a first threshold, the second controller controlling the transmitter to transmit the electronic code to a second group of data sources, each of the data sources in the second group of data sources having a data transfer rate lower than a communications switch marking threshold, the communications switch marking threshold being equal to the first function of the at least one communications switch maximum data transfer rate multiplied by the second function of the at least one second congestion indicator when the at least one second congestion indicator equals or exceeds the first threshold, the second controller controlling the transmitter to transmit electronic code to all the data sources when the at least one second congestion indicator equals or exceeds a second threshold, the second controller controlling the transmitter to transmit electronic code to all the data sources when the at least one second congestion indicator is lower than the first threshold, and the second controller controlling the transmitter to transmit electronic code to all the data sources when the at least one first congestion indicator is greater than or equal to a third threshold, wherein the data transfer rate information transmitted to the first group of data sources when the at least one second congestion indicator equals or exceeds the first threshold is used by each one of the data sources in the first group of data sources to reduce its data transfer rate, the data transfer rate information transmitted to the second group of data sources when the at least one second congestion indicator equals or exceeds the first threshold is used by each one of the data sources in the second group of data sources to increase its data transfer rate, wherein the data transfer rate information is transmitted to all data sources when the at least one second congestion indicator equals or exceeds the second threshold to reduce the data transfer rates of all the data sources, wherein the data transfer rate information is transmitted to all data sources when the at least one second congestion indicator is lower than the first threshold to increase the data transfer rates of all the data sources, and wherein the data transfer rate information is transmitted to all data sources when the first congestion indicator is greater or equal than the third threshold to decrease the data transfer rates of all the data sources.

41. The apparatus of claim 40, further comprising a receiver for receiving the electronic code from at least one data source, the second controller updating the at least one communications switch maximum data transfer rate and the data source identifier after the receiver receives the electronic code from the one data source, the receiver receiving the electronic code from one of available bit rate data sources and non-available bit rate data sources.

42. The apparatus of claim 40, further comprising a plurality of second congestion indicator registers, each second congestion indicator register storing at least one second congestion indicator, wherein more than one second congestion indicator is compared to the first and second thresholds.

43. The apparatus of claim 40, further comprising means for assigning a first priority to the electronic code received from available bit rate data sources, the first priority equal to a priority for non-available bit rate data sources.

44. The apparatus of claim 40, further comprising a plurality of first congestion indicator registers, each first congestion indicator register storing one first congestion indicator, wherein a plurality of first congestion indicators are compared to the third threshold.

* * * * *